United States Patent [19]

Gartner

[11] Patent Number: 4,531,550
[45] Date of Patent: Jul. 30, 1985

[54] PLUG FOR USE IN THERMAL-MEDIUM PASSAGES IN AIR CONDITIONING SYSTEMS

[75] Inventor: Karl Gartner, Gundelfingen, Fed. Rep. of Germany

[73] Assignee: Yoshida Kogyo K.K., Tokyo, Japan

[21] Appl. No.: 515,176

[22] Filed: Jul. 19, 1983

[30] Foreign Application Priority Data

Jul. 21, 1982 [JP] Japan ................... 57-110378

[51] Int. Cl.³ ................ F16L 55/09; F16L 55/12
[52] U.S. Cl. ...................................................... 138/89
[58] Field of Search .................... 138/89, 90, 92; 220/224, 235, 236

[56] References Cited

U.S. PATENT DOCUMENTS

| | | | |
|---|---|---|---|
| 922,544 | 5/1909 | Turner et al. | 138/90 |
| 2,512,041 | 6/1950 | Steele | 138/89 X |
| 2,743,034 | 4/1956 | Wheatley | 138/89 X |
| 2,763,293 | 9/1956 | Kruck | 138/89 |
| 2,923,323 | 2/1960 | Franck | 138/89 |
| 3,326,404 | 6/1967 | Gardner | 220/235 |
| 3,494,504 | 2/1970 | Jackson | 138/89 X |
| 3,901,167 | 8/1975 | Reese | 220/235 X |
| 4,310,029 | 1/1982 | Dudek | 138/89 |
| 4,385,643 | 5/1983 | Noe | 220/236 X |

FOREIGN PATENT DOCUMENTS

| | | | |
|---|---|---|---|
| 676280 | 12/1963 | Canada | 138/90 |
| 789421 | 10/1935 | France | 138/89 |
| 2023277 | 12/1979 | United Kingdom | |
| 2102090 | 1/1983 | United Kingdom | |

*Primary Examiner*—Stephen Marcus
*Assistant Examiner*—Mark Thronson
*Attorney, Agent, or Firm*—Hill, Van Santen, Steadman & Simpson

[57] ABSTRACT

A plug assembly for use in a thermal-medium passage in a unit curtain wall, for example, comprises a circular gasket seat having a central cylinder with an annular elastomeric gasket placed on the gasket seat around the central cylinder, and a sleeve fitted over the central cylinder and fastened thereto by a fastener such as a hexagonal socket head cap screw threaded through a bottom of the sleeve axially into the central cylinder. When the plug assembly is to be put in the thermal-medium passage, the plug assembly is inserted into the passage with the fastener slightly loosened. After the plug assembly has been pushed to a desired position in the passage, the fastener is tightened by a tightening tool until the annular elastomeric gasket is resiliently squeezed between the sleeve and the gasket seat radially outwardly against an inner circumferential wall of the passage. A heat-transporting medium such as hot water can be prevented by the annular elastomeric gasket from flowing through the passage. The plug assembly is retained in position by a setscrew threaded through a passage wall against the sleeve.

5 Claims, 7 Drawing Figures

FIG. 1
FIG. 2
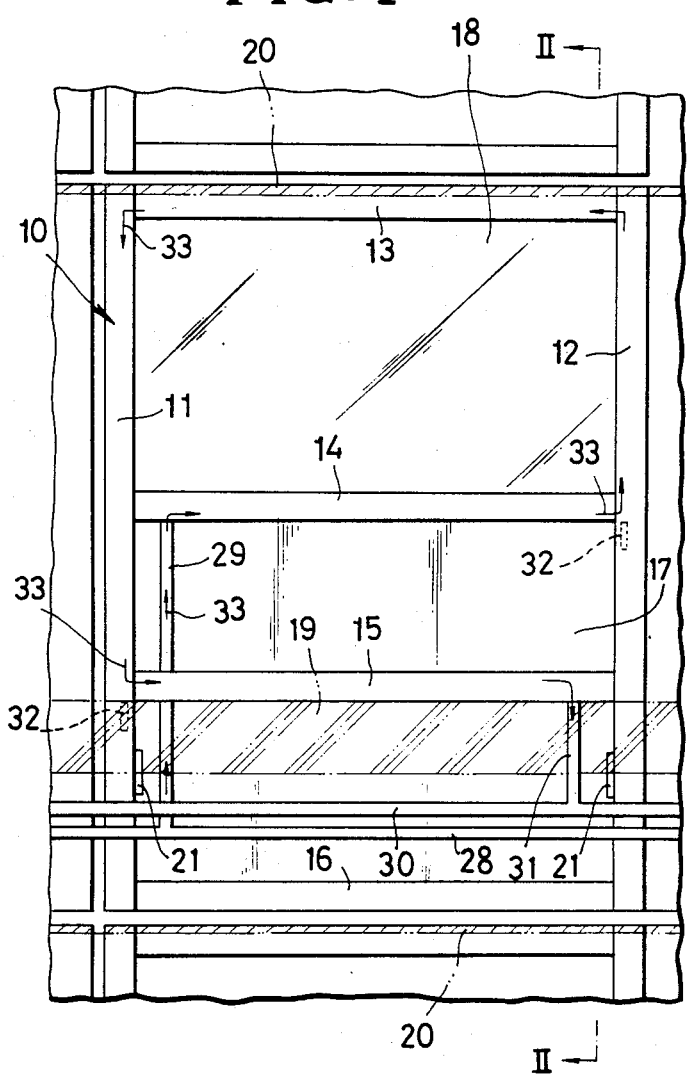
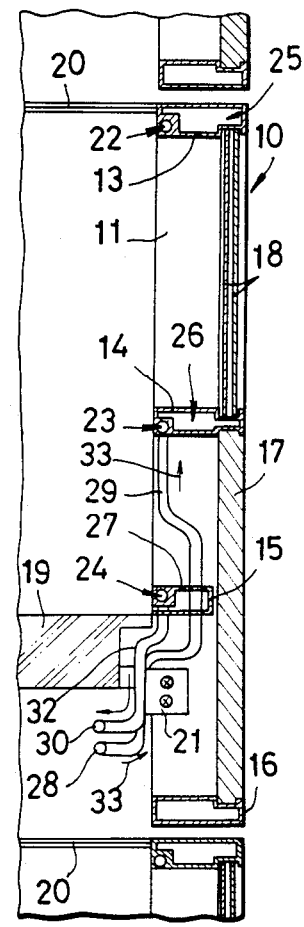

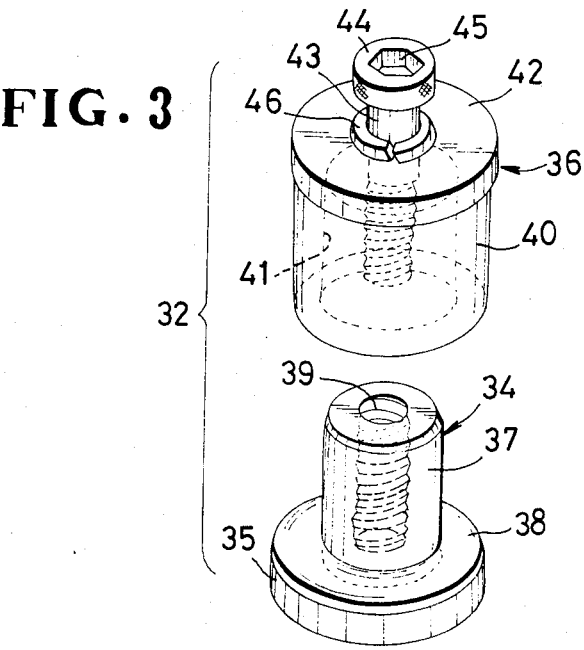
FIG. 3
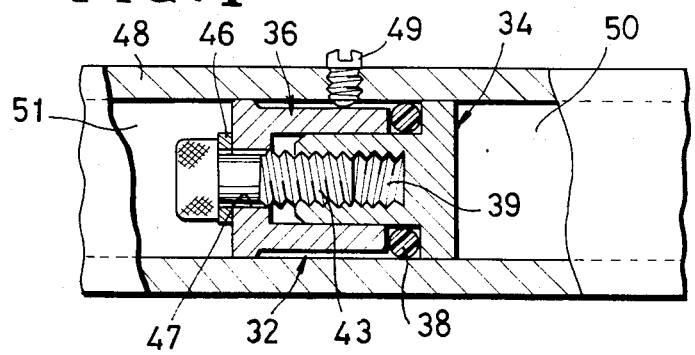
FIG. 4
FIG. 5

PLUG FOR USE IN THERMAL-MEDIUM PASSAGES IN AIR CONDITIONING SYSTEMS

BACKGROUND OF THE INVENTION

1. Field of the Invention

The present invention relates to a plug assembly for use in a fluid passage, and more particularly to a plug device for use in a thermal-medium passage extending through hollow vertical and horizontal members assembled as part of an air conditioning system in interior and exterior wall constructions such as unit curtain walls, partitions and the like.

SUMMARY OF THE INVENTION

It is an object of the present invention to provide a plug assembly of a simple construction for reliably closing a heat-transporting medium passage of an air conditioning system.

Another object of the present invention is to provide a plug assembly which can easily and smoothly be inserted to any desired position in a thermal-medium passage and then remotely actuated to close off the passage for completely blocking the flow of a thermal liquid therethrough.

According to the present invention, a plug assembly including a gasket seat having a central cylinder with an annular elastomeric gasket placed on the gasket seat around the central cylinder, and a sleeve fitted over the central cylinder and fastened thereto by a fastener such as a screw threaded through a bottom of the sleeve axially into the central cylinder. When the plug assembly is to be placed in a thermal-medium passage, the screw is loosened slightly and the plug assembly is inserted into the passage with an elongate tightening tool. After the plug assembly has been pushed to a desired position in the passage, the screw is tightened by the tightening tool until the annular elastomeric gasket is pressed between the gasket seat and an annular axial end of the sleeve and resiliently squeezed radially outwardly against an inner circumferential wall of the passage. A heat-transporting medium such as hot water is then prevented by the annular elastomeric gasket from flowing through the passage. The plug assembly is retained in position by a set screw threaded through a passage wall and pressed against the sleeve.

Many other advantages and features of the present invention will become manifest to those versed in the art upon making reference to the detailed description and the accompanying sheets of drawings in which preferred structural embodiments incorporating the principles of the present invention are shown by way of illustrative example.

BRIEF DESCRIPTION OF THE DRAWINGS

FIG. 1 is a front elevational view of a unit curtain wall incorporating plug assemblies according to the present invention, the view showing the unit curtain wall as seen from the interior of a room;

FIG. 2 is a cross-sectional view taken along line II—II of FIG. 1;

FIG. 3 is an exploded perspective view of a plug assembly according to the present invention;

FIGS. 4 and 5 are fragmentary longitudinal cross-sectional views showing the manner in which the plug assembly is installed in a thermal-medium passage;

DETAILED DESCRIPTION

Figure 6:
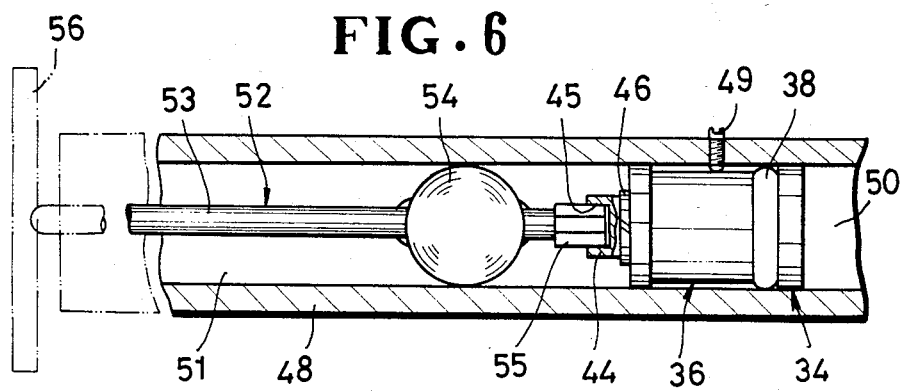
FIG. 6 is a fragmentary longitudinal cross-sectional view illustrative of the way in which the plug assembly is tightened in place by a tightening tool.

FIGS. 1 and 2 illustrate a unit curtain wall, generally designated by the reference character 10, which constitutes an outer wall of a building. The unit curtain wall 10 includes a framework composed of a pair of hollow vertical frame members 11, 12 laterally spaced from each other, and a plurality of hollow horizontal frame members 13, 14, 15, 16 (four in the illustrated embodiment) vertically spaced from each other and interconnecting the hollow vertical frame members 11, 12. These vertical and horizontal frame members are made of extruded aluminum. The unit curtain wall 10 also comprises a panel 17 fitted between the horizontal frame members 14, 16 and a pair of glass panes 18, 18 fitted between the horizontal frame members 13, 14. The unit curtain wall 10 is attached by fasteners 21, 21 to an exterior building surface with the horizontal frame members 13, 15 positioned adjacent respectively to a ceiling 20 and a floor 19 of the building.

As shown in FIG. 2, the hollow horizontal frame members 13, 14, 15 have longitudinal thermal-medium passages 22, 23, 24, respectively, and longitudinal air passages 25, 26, 27, respectively. Although not shown, the hollow vertical frame members 11, 12 also have such longitudinal thermal-medium and air passages. These thermal-medium and air passages can be formed at the same time that the horizontal and vertical frame members are extruded. When the unit curtain wall 10 is assembled, the thermal-medium passages 22–24 in the horizontal frame members 13–15 are held in fluid communication with the thermal-medium passages in the vertical frame members 11, 12. The thermal-medium passages thus interconnected serve as part of an air conditioning system for enabling the unit curtain wall 10 to directly warm or cool the interior of a room by passing hot or cool water through the thermal-medium passages. While the heat-transporting medium is flowing through the thermal-medium passages, the hollow vertical and horizontal frame members 11–15 serve as heat radiators or heat exchangers.

The thermal medium such as hot water is supplied from a supply pipe 28 having a branch pipe 29 connected to the thermal-medium passage 23 in the horizontal frame member 14 and discharged into a return pipe 30 having a branch pipe 31 connected to the thermal-medium passage 24 in the horizontal frame member 15. During operation of the air conditioning system, the thermal medium flows in the directions of the arrows 33 from the supply pipe branch 29 through the horizontal frame member 14, the vertical frame member 12, the horizontal frame member 13, the vertical frame member 11, and the horizontal frame member 15, from which the thermal medium is discharged via the branch pipe 31 back into the return pipe 30.

Since all of the frame members 11–15 are extrusion-molded and function as load-bearing members, they have uniform cross-sectional shapes. It is therefore necessary to prevent the heat-transporting medium from flowing into unwanted portions of the frame members, that is, to guide the thermal medium to flow from the horizontal frame member 14 into the vertical frame member 12 in the direction of the arrow 33 and also from the vertical frame member 11 into the horizontal frame member 15 in the direction of the arrow 33. To this end, two plug assemblies 32, 32 according to the present invention are disposed in the thermal-medium passages in the vertical frame members 11, 12 as shown in FIG. 1.

As illustrated in FIG. 3, the plug assembly 32 generally comprises a male member 34 and a female member 36. The male member 34 has a circular gasket seat 35 having substantially the same diameter as the inside diameter of the thermal-medium passages, a central cylinder 37 projecting perpendicularly from the circular gasket seat 35, and an annular elastomeric gasket 38 disposed on the circular gasket seat 35 around the central cylinder 37. The gasket seat 35 is an imperforate disc with an annular axially directed seating surface forming part of a gasket groove or O-ring groove of adjustable width. The central cylinder or post 37 at the annular axially directed seating surface also defines part of such groove. The central cylinder 37 has an axial internally threaded blind hole 39. The female member 36 includes a cylindrical sleeve 40 having an axial sleeve hole 41 and a bottom or end portion or member 42 attached to one end of the cylindrical sleeve 40 and having substantially the same diameter as the inside diameter of the thermal-medium passages. The bottom 42 has a central hole 47 (FIG. 4). In an assembled state, the sleeve 40 is fitted over the cylinder 37 and a fastener 43 such as a hexagonal socket head cap screw is threaded through the hole 47 into the internally threaded hole 39 in the cylinder 37 with a spring or lock washer 46 placed between the bottom 42 and a head 44 of the fastener 43. The fastener 43 is threaded into the hole 39 until an axial end or inner annular seating surface of the sleeve 40 is positioned axially adjacent to the annular elastomeric gasket 38. The annular elastomeric gasket 38 in adjustable groove-defining position can be resiliently squeezed radially outwardly when it is axially pressed between the axial end of the sleeve 40 and the gasket seat 35 on in response to tightening of the fastener 43.

The manner in which the plug assembly 32 is inserted and fixed in a pipe 48 is described with reference to FIGS. 4, 5 and 6. The pipe 48 is equivalent to the structure which defines each of the thermal-medium passages. The plug assembly 32 is inserted by suitable means such as an elongate pusher rod to any desired position in the pipe 48. At this time, the fastener 43 remains slightly loosened to allow smooth insertion of the plug assembly 32 into the pipe 48. A tightening tool 52 as shown in FIG. 6 is used to tighten the fastener 43 in the plug assembly 32 placed in the pipe 48. The tightening tool 52 includes a shank 53 having a guide ball 54 of metal or synthetic resin mounted thereon, the guide ball 54 having a diameter substantially the same as the inside diameter of the pipe 48. A handle 56 is attached to one end of the shank 53, and a hexagonal screwdriver head 55 is attached to the other end close to the guide ball 54. The guide ball 54 serves to keep the hexagonal screwdriver head 55 in coaxial relation to the pipe 48. The tightening tool 52 is inserted into the pipe 48 until the hexagonal screwdriver head 55 is received in a hexagonal socket 45 in the head 44 of the fastener 43. Then the handle 56 is turned to tighten the fastener 43 to thereby press the annular elastomeric gasket 38 axially between the sleeve 40 and the gasket seat 35, whereupon the gasket 38 is resiliently forced radially outwardly against an inner peripheral wall of the pipe 48. The plug assembly 32 completely closes off the pipe 48, dividing the latter into two passage sections 50, 51 one of which allows the thermal medium to flow therein. The annular elastomeric gasket 38 is forcibly held in intimate contact with the inner peripheral surface of the pipe 48 for completely cutting off the flow of the thermal medium through the pipe 48. The plug assembly 32 is also advantageous in that it can be retained in place anywhere in the pipe 48 without machining or otherwise altering the pipe 48, so that the latter can maintain its mechanical strength.

Prior to the tightening of the fastener 43, the sleeve 40 can be retained in place in the pipe 48 by a setscrew 49 threaded radially through the wall of the pipe 48 against the sleeve 40 as shown in FIGS. 4 and 6. The sleeve 40 is prevented by the setscrew 49 from rotating in the pipe 48. Therefore, the plug assembly 32 is also prevented from rotating while the fastener 43 is being tightened by the tightening tool 52. The setscrew 49 as it projects radially into the pipe 48 serves as a reference to position the plug assembly 32 when the latter is inserted into the pipe 48 since the plug assembly 32 is stopped by the setscrew 49. The setscrew 49 also serves to prevent the plug assembly 32 from moving axially under any pressure difference between the passage sections 50, 51.

Figure 7:
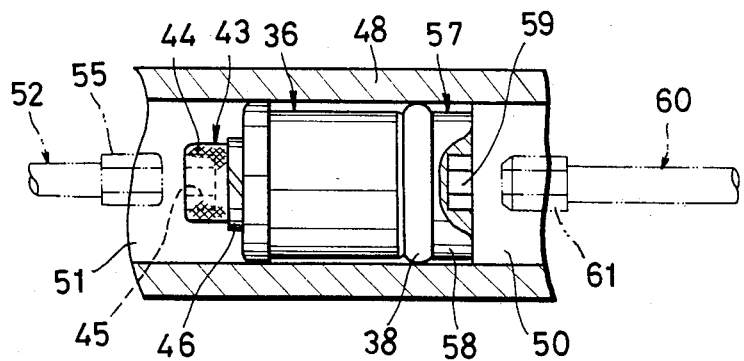
FIG. 7 is a fragmentary longitudinal cross-sectional view showing a modified plug assembly and the manner of tightening the same in a thermal-medium passage.

FIG. 7 illustrates a modified plug assembly including a male member 57 having a circular gasket seat 58 with a central hexagonal socket 59 opening away from the hexagonal head 45 in the fastener head 44. When this plug assembly is placed in the passage 48, another tightening tool 60 similar to the tightening tool 52 is employed. The tightening tool 60 has a hexagonal screwdriver head 61 that can fit into the socket 59 in the gasket seat 58. In use, the screwdriver heads 55, 61 of the respective tightening tools 52, 60 are fitted in the sockets 45, 59, respectively, and one of the tightening tools 52, 60 may be held at rest to keep the plug assembly 32 from rotating while the other tightening tool is rotated to tighten the fastener 43. Alternatively, the tightening tools 52, 60 are rotated in opposite directions to tighten the fastener 43 quickly. The modified plug assembly shown in FIG. 7 is particularly advantageous in applications in which the thermal medium flows in both the passage sections 50, 51 where no setscrew can be used due to the possibility of leakage of the thermal medium through the setscrew hole in the wall of the pipe 48. With the thermal liquid present in the passage sections 50, 51, the plug assembly is subjected to no large pressure difference and hence can be retained in place only by the gasket 38 pressed frictionally against the inner peripheral surface of the pipe 48.

While the plug assembly 32 has been shown and described as being incorporated in the unit curtain wall 10, it may be assembled into other interior and exterior building wall constructions such as partitions in rooms, for example, which are used as part of air conditioning systems.

Although various minor modifications may be suggested by those versed in the art, it should be understood that I wish to embody within the scope of the patent warranted hereon, all such embodiments as reasonably and properly come within the scope of my contribution to the art.

What is claimed is:

1. A plug assembly for use in a fluid passage, comprising:

(a) a gasket seat having a contour substantially equal to an inner peripheral surface of the fluid passage;

(b) a central cylinder projecting from and fixed to said gasket seat and having an internally treaded hole;

(c) an elastomeric gasket disposed on said gasket seat around said central cylinder;

(d) a sleeve adapted to fit over said central cylinder;

(e) an end member attached to an end of said sleeve and having a hole;

(f) a threaded fastener adapted to be threaded through said hole in said end member into said internally threaded hole for pressing said elastomeric gasket axially between said gasket seat and said sleeve and resiliently radially outwardly against the inner peripheral surface of the fluid passage, said fastener comprising a socket head cap screw including a head having a first hexagonal socket; and (g) said gasket seat having means for use not only in preventing said gasket seat and thus said central cylinder from corotation with said socket head cap screw but alternatively also in rotating said gasket seat and thus said central cylinder in a direction opposite to the rotation of said socket head cap screw, while the latter is threaded into said internally threaded hole of said central cylinder.

2. A plug assembly according to claim 1, said means comprising a second hexagonal socket defined in said socket seat and opening away from said first hexagonal socket.

3. A plug assembly for use in a fluid passage, comprising:

(a) an imperforate gasket seat having a contour substantially equal to an inner peripheral surface of the fluid passage;

(b) a central cylinder projecting from said gasket seat and having an internally threaded hole;

(c) an elastomeric gasket disposed on said gasket seat around said central cylinder;

(d) a sleeve adapted to fit over said central cylinder within the fluid passage;

(e) an end member attached to an end of said sleeve and having a hole; and (f) a threaded fastener adapted to be threaded through said hole in said end member into said internally threaded hole for pressing said elastomeric gasket axially between said gasket seat and said sleeve and resiliently radially outwardly against the inner peripheral surface of the fluid passage, said fastener comprising a socket head cap screw including a head having a first socket, said gasket seat having a second socket defined therein and opening away from said first socket, the socket of said cap screw and said gasket seat being hexagonal.

4. A plug assembly for use in a device having a fluid passage, comprising:

(a) an imperforate disc having an outer periphery receivable in the fluid passage, and an imperforate annular axially directed gasket seat;

(b) a cylindrical post integral at one end with said disc within said annular seat, and at its other end having a blind threaded axial opening;

(c) an elastomeric O-ring surrounding said cylindrical post and engaging said annular seat;

(d) a cup-shaped cylindrical sleeve slidably disposed on said cylindrical post and having at one end an inner annular seating surface parallel to said gasket seat and engaging said annular gasket, and with said cylindrical post forming an O-ring groove of adjustable axial extent;

(e) said sleeve having at its other end an apertured end portion integral therewith, and having an outer periphery corresponding to that of said disc for being received in the fluid passage; and (f) a screw having a threaded portion extending through said apertured portion into said threaded opening, and a head portion engaging said end portion of said sleeve, and (g) each of said head portion and said imperforate disc having an axially directed non-circular cross-section engageable with a hand tool of complementary configuration to enable rotation thereof to extrude said O-ring radially within the fluid passage.

5. A plug assembly according to claim 4, said cross-section being hexagonal.

* * * * *